(12) United States Patent
Mohammed et al.

(10) Patent No.: US 8,060,932 B2
(45) Date of Patent: Nov. 15, 2011

(54) MODULAR ENTERPRISE AUTHORIZATION SOLUTION

(75) Inventors: Mannan Mohammed, Gilbert, AZ (US); Saivendra Kayal, Irvine, CA (US); Ron Tielke, Phoenix, AZ (US); Mark Brown, Chandler, AZ (US); Nathan Dolly, Battle Ground, WA (US)

(73) Assignee: Microsoft Corporation, Redmond, WA (US)

( * ) Notice: Subject to any disclaimer, the term of this patent is extended or adjusted under 35 U.S.C. 154(b) by 1046 days.

(21) Appl. No.: 11/556,607

(22) Filed: Nov. 3, 2006

(65) Prior Publication Data

US 2008/0109898 A1 May 8, 2008

(51) Int. Cl.
 *G06F 7/04* (2006.01)
(52) U.S. Cl. .......... 726/21; 713/182; 713/183; 713/184; 713/185; 726/4; 726/5; 726/9; 726/17; 726/19
(58) Field of Classification Search .................... 726/21, 726/4, 5, 9, 17, 19, 20, 10; 713/182–185
See application file for complete search history.

(56) References Cited

U.S. PATENT DOCUMENTS

| | | | |
|---|---|---|---|
| 6,055,637 A * | 4/2000 | Hudson et al. ................. | 726/20 |
| 6,202,066 B1 | 3/2001 | Barkley et al. | |
| 6,381,579 B1 | 4/2002 | Gervais et al. | |
| 6,453,353 B1 | 9/2002 | Win et al. | |
| 6,460,141 B1 | 10/2002 | Olden | |
| 6,782,379 B2 | 8/2004 | Lee | |
| 6,985,955 B2 | 1/2006 | Gullotta et al. | |
| 6,990,527 B2 | 1/2006 | Spicer et al. | |
| 2003/0115484 A1 * | 6/2003 | Moriconi et al. ............. | 713/201 |
| 2004/0024764 A1 | 2/2004 | Hsu et al. | |
| 2004/0205342 A1 | 10/2004 | Roegner | |
| 2004/0210452 A1 | 10/2004 | Aboujaoude et al. | |
| 2005/0102154 A1 | 5/2005 | Dodd et al. | |
| 2006/0015933 A1 * | 1/2006 | Ballinger et al. ............... | 726/10 |

OTHER PUBLICATIONS

Ferraiolo, et al., "The Role Control Center: Features and Case Studies", SACMAT'03, Jun. 2-3, 2003, pp. 12-20, ACM, 2003, Como, Italy.
Bhatti, et al., "X-GTRBAC Admin: A Decentralized Administration Model for Enterprise-Wide Access Control", ACM Transactions on Information and Systems Security, vol. 8, No. 4, Nov. 2005, pp. 388-423.
Lin, et al. "Security in Enterprise Networking: A Quick Tour", IEEE Communications Magazine, Jan. 1996, 0163-6804/96, pp. 56-61.
ENDFORCE, Inc., "ENDFORCE Enterprise—How It Works", http://www.endforce.com/Products/EFEHowItWorks.asp.

* cited by examiner

*Primary Examiner* — David J Pearson
*Assistant Examiner* — Angela Holmes
(74) *Attorney, Agent, or Firm* — Vierra Magen Marcus & DeNiro LLP

(57) ABSTRACT

An authorization framework located external to an application may be invoked to determine user authorization for a requested application component. Small amounts of supplemental authentication code are added to application code to invoke provider modules within the authentication framework. The provider modules perform authorization functions outside of the application and return authorization results to the application. The functions include determining a user role, determining the permissions associated with the user role, comparing the role permissions to the security defined on the requested application component by a rule, and returning an authorization state to the authentication framework. The supplemental authentication code may invoke one or more providers through provider interfaces that translate requests to a particular provider. Using the provider based authorization framework, authorization for an application component is achieved externally without hard-coding authorization code within the application itself.

20 Claims, 11 Drawing Sheets

MODULAR ENTERPRISE AUTHORIZATION SOLUTION

BACKGROUND

Enterprise applications that handle sensitive data need to provide security to protect this data. Typical security systems for an enterprise application provide security through user authentication and authorization. The authentication process identifies the user and confirms that the user logging into a system is associated with a particular account. User authorization relates to permissions associated with a particular account and specifies what a logged in user can do.

Most security systems implement authentication and authorization from within the application itself. Code implementing the authorization engine is usually hard-coded into the application. As the sophistication of the security and the amount of data secured has increased, the code within an application required to implement security has increased. These large code requirements use valuable memory and processing resources for applications and can affect performance of the application.

SUMMARY

Embodiments of the modular authorization framework described herein allow user authorization to be performed outside the application. Authorization for a component is achieved externally without hard-coding authorization code within the application itself. Small amounts of supplemental authentication code are added to an application to invoke provider modules located outside the application. The invoked provider modules perform authorization functions outside of the application and return authorization results to the application. The authorization framework is an external authorization system, external to an application, which provides authorization of application components such as a method, user interface (UI) element, a control on a web page, and other application elements requested by or accessible to a user. In some embodiments, the authorization framework provides an extensible solution that extends the authorization support built into an existing framework.

Authorization for a component may be defined using roles and rules. In some embodiments, a rule binds a component to a role using an operation. A role is a group of one or more users which are attributed a certain permission or level of security authorization. Examples of roles may include manager, consultant, supervisor, and employee. A rule specifies an operation which a role can or can not do to a particular component. Examples of operations include create, read, update, delete (called "CRUD" operations) and others. A component is anything within or provided by an application that is securable, such as a user interface text box or button, a method on a business component, a page for a user interface, a Social Security number or other data, or some other application component.

An embodiment includes receiving an authorization request by an authorization framework. The request is received by the framework from supplemental authorization code inside an application, wherein the authorization framework is located external to the application. The supplemental authorization code is associated with an application component and added to application code associated with the application component. A determination is made as to whether a role is authorized to perform a requested operation on the application component by the authorization framework. A token which indicates application component authorization is then configured in response to the determination. After configuring the token, the token is provided to the application.

An embodiment includes receiving a user-initiated request for access to an application component. A user role is retrieved from a first provider module and a rule associated with the application component is retrieved from a second provider module. The first provider module and second provider module are included in a set of provider modules located external to the application. User authorization is then determined based on the retrieved user role and rule.

In some embodiments, supplemental authorization code is added to an application. A request is then received for an application component associated with the supplemental authorization code. The supplemental authorization code invokes an authorization framework located external to the application and then receives authorization results from the external authorization framework.

In some embodiments, an authorization framework located external to an application may include a set of providers and a set of provider interfaces. Role data and rule data is stored within the set of providers. The role data is associated with a user of an application and the rule data is associated with an application component. The set of providers may access the role data in response to a first request received through the set of provider interfaces from the application. The rule data may be accessed in response to a second request received through the set of provider interfaces from the application. An authorization state can be determined from the accessed role data and rule data and provided to the application.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1A:
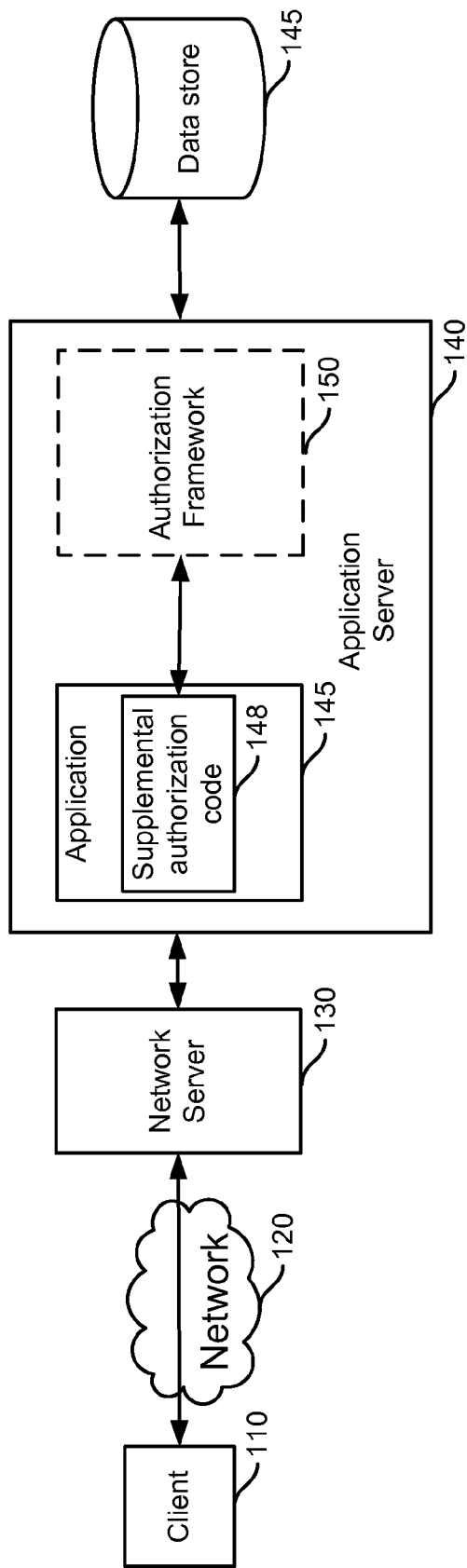
FIG. 1A is a block diagram of an embodiment of a system for externalizing application authorization for a network-based application.

Embodiments of the modular authorization framework described herein allow user authorization to be performed outside the application. Authorization for a component is achieved externally without hard-coding authorization logic within the application itself. Small amounts of supplemental authentication code are added to an application to invoke provider modules located outside the application. The invoked provider modules perform authorization functions outside of the application and return authorization results to the application. The authorization framework is an external authorization system, external to an application, which provides authorization of application components such as a method, user interface (UI) element, a control on a web page, and other application elements requested by or accessible to a user. Thus, the external authorization system is implemented by the authorization framework. The integration of the authorization framework and policy into an existing application is done with minimal code additions to the application itself. In some embodiments, the authorization framework provides an extensible solution that extends the authorization support built into the "ASP.NET Framework 2.0," provided by Microsoft Corporation, of Redmond Wash.

Authorization for a component may be defined using roles and rules. A rule binds a component to the role using an operation. A role is a group of one or more users which are attributed a certain permission or level of security authorization. Examples of roles may include manager, consultant, supervisor, and employee. A rule specifies an operation which a role can or can not do to a particular component. Examples of operations include create, read, update, delete (called "CRUD" operations) and others. In one embodiment, a rule may be expressed as a pseudo English expression and an operation, such as "create: manager or teller", indicating a manager or teller may create a particular data, or "read:employee and supervisor," indicating an employee or supervisor may read a particular data. A component is anything within or provided by an application that is securable, such as a user interface text box or button, a method on a business component, a page for a user interface, a Social Security number or other data, or some other application component.

The modular aspect of the authorization framework is provided by using one or more provider modules to provide authorization capability outside an application. The provider modules communicate with supplemental authorization code in an application through provider interfaces. The interfaces receive calls from the supplemental authorization code, send requests to the appropriate provider, and provide the result in response to the call from the supplemental authorization code. Thus, when different providers are used or replaced, there is no need to completely change the authorization code within the application. Rather, the provider is configured to communicate with the interface. Using a modular provider system, the authorization framework may be scalable and flexible; more or less providers, having different data and capacities, may be used to change the ability and performance of the authorization framework. The providers can be implemented by different sources, such as: ASP.Net of Microsoft, of Redmond, Wash.; PeopleSoft, of Redwood Shores, Calif.; Oracle Corporation, of Redwood Shores, Calif.; and others. As such, a consistent usage pattern may be used across different types of applications, such as web applications, smart clients, web services, and other applications.

In some embodiments, the supplemental authentication code may be part of a declarative model to define security for a component. The declarative model involves adding small amounts of code to component access code within an application to be protected. The concept of adding supplemental authorization code may be used with C++, JAVA or other code which implements an application. In some embodiments, the supplemental authorization code may send a request to a provider module through a provider interface. The provider interface may then forward the request to the particular provider module which will ultimately process the request.

As discussed above, the authorization framework may be implemented as an extension to the ASP.NET framework. In some embodiments, ASP.NET is a type of active server page framework. An active server page (ASP) is an HTML page that includes one or more scripts that are processed on a web server before the page is sent to the user. An ASP is somewhat similar to a server-side include or a common gateway interface (CGI) application in that all involve programs that run on the server, usually tailoring a page for the user. Typically, the script in the web page at the server uses input received as the result of the user's request for the page to access data from a database and then builds or customizes the page on the fly before sending it to the requestor. ASP.NET is a type of Active Server Page that allows a web site builder to dynamically build web pages on the fly by inserting queries to a relational database in the Web page. ASP.NET supports code written in compiled languages such as Visual Basic, C++, C#, and Perl, and features server controls that can separate the code from the content.

FIG. 1A is a block diagram of an embodiment of an authorization system. FIG. 1A includes client 110, network 120, network server 130, application server 140 and data store 145. Client 110 may access a network service provided by network server 130 over network 120. Typically, network server 130 receives a request from client 110 and sends a request to application 145 of application server 145 in response to the client request. Application 145 processes the request, generates a response and provides the response to network server 130. Network server 130 receives the response from application 145 of application server 140, generates a response for client 110 from the response and sends the generated response to client 110.

Network 120 may be implemented as a private or public network over which client 110 and application server 140 may communicate. In one embodiment, network 120 may be implemented as the Internet, an intranet, or some other network.

Application server 140 includes application 145 and authorization framework 150. Application 145 includes supplemental authorization code 148. As discussed above, application 145 may process requests received from network server 130 by generating a response and sending the response to network server 130. In processing a request, application server 140 may send a request or other message to data store 145. Application server 140 may communicate with data store 145 over a private or public network implemented as an internet, intranet, or the Internet.

Supplemental authorization code 148 invokes authorization framework 150. Supplemental authorization code 148 can be added to application 145 as object code, programming code such as Java or C++, or some other code. In some embodiments, supplemental authorization code 148 is added to a component of application 145 to be secured, such as a method, a web page control, data, or some other component. When invoked, authorization framework 150 determines whether a user associated with a request to access the application component is authorized for the request. For example, authorization framework 150 may determine whether a "teller" user is authorized to read or update a social security number of a customer. Authorization framework 150 may be located on application server 140 or outside application server (not shown in FIG. 1A). Thus, the framework may not be located on the same machine. Authorization framework 150 is discussed in more detail below with respect to FIG. 1B.

Data store 145 may be implemented as one or more servers, computing devices, or other machines capable of storing data. Data store 145 may process requests received from application server 140 to create, read, update, delete or perform some other action on stored data.

Figure 1B:
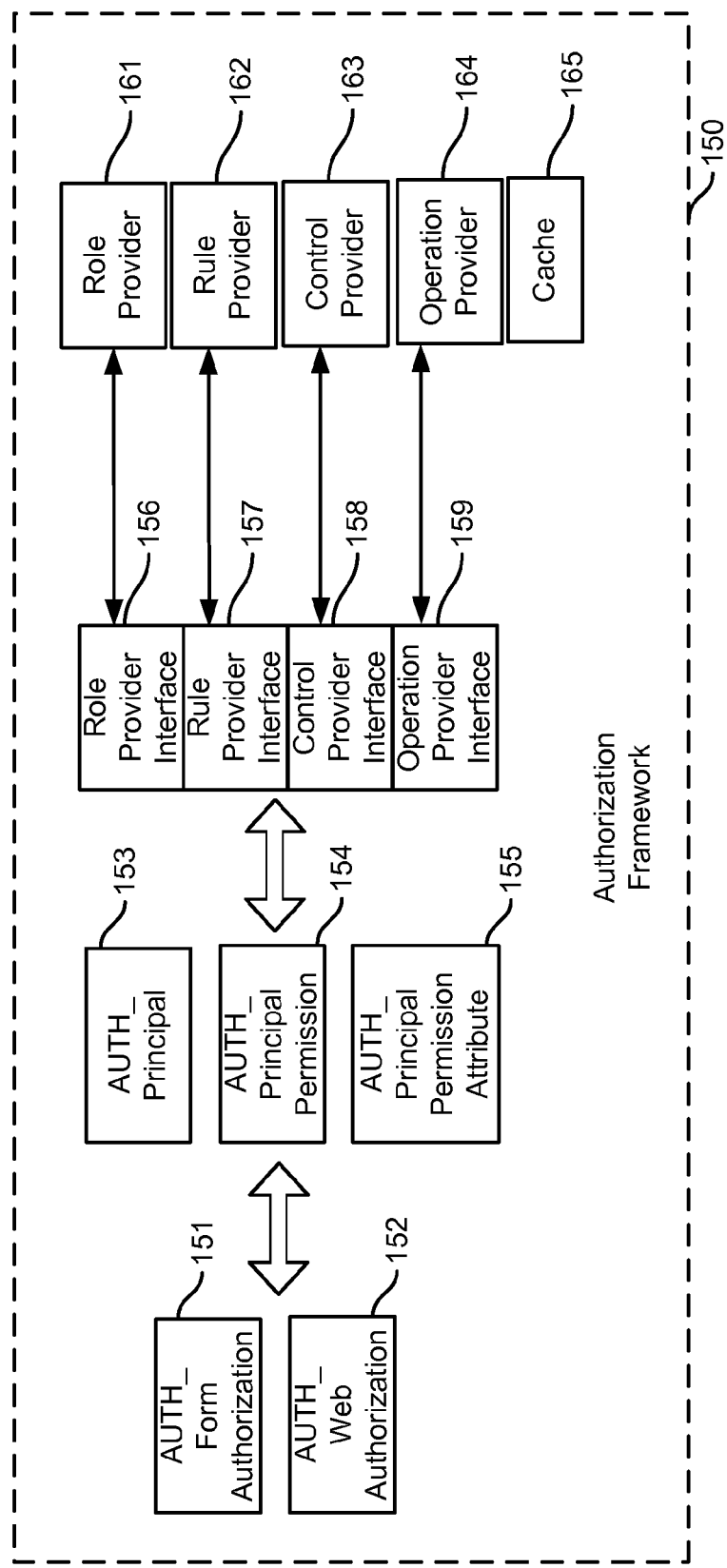
FIG. 1B is a block diagram of an authorization framework.

FIG. 1B illustrates a block diagram of an embodiment of an authorization framework. In one embodiment, authorization framework 150 of FIG. 1B provides more detail of authorization framework 150 of FIG. 1A. Authorization framework 150 of FIG. 1B includes AUTH_Form Authorization module 151, AUTH_Web Authorization module 152, AUTH_Principal module 153, AUTH_Principal Permission module 154, AUTH_Principal Permission Attribute module 155, role provider interface 161, rule provider interface 162, control provider interface 163, operation provider interface 164, role provider 161, rule provider 162, control provider 163, operation provider 164 and cache 165.

AUTH_Form Authorization module 151 implements logic to provide authorization support for Smart Clients. Smart clients are client applications that use remote invocation of logic such as web services, net remoting, or Java RMI and reside on user hardware such as desktop PCs, laptops, Pocket PCs, and other devices. They are easily deployed and managed and provide an adaptive, responsive, and rich interactive experience by taking advantage of the computing resources on the device and intelligently connecting to distributed data sources. Thus, AUTH_Form Authorization module 151 may secure an entire form generated for a smart client.

In some embodiments, module 152 may be implemented as one or more classes that can be stored in a library and start the authorization process for a web page when invoked by supplemental authorization code 148. A first class as part of AUTH_Form Authorization module 151 may be implemented as shown below.

```
public class AUTHSecureWeb
{
    AUTHSecureWeb( );
    public void Secure(Page page, string authComponentProvider);
}
```

In one embodiment, the AUTHSecureWeb class provides one key method "secure( )" that is invoked on each active server page for the web client (for example, an aspx page). Another class can be declared as a wrapper class to encapsulate two functions used in securing web clients. This class may be implemented as shown below.

```
internal class AUTHWebHtmlControlWrapper
{
    public AUTHWebHtmlControlWrapper(object obj);
    public bool Visible( );
    public bool Enabled( );
}
```

When invoked by supplemental authorization code 148, the method "Visible( )" returns a boolean value indicating whether the web page protected is visible. The method "Enabled( )" returns a boolean value indicating whether the web page protected is enabled. Thus, either method may be invoked to provide a desired consequence (either not visible or not enabled) for a user that is not authorized to see a particular page on a smart client.

AUTH_Web Authorization module 152 implements logic to provide authorization support for a web client (e.g., a WebForm) in ASP.NET. In some embodiments, AUTH_Web Authorization module 151 may secure an entire WebForm or a portion of a WebForm generated for a web client.

In some embodiments, module 152 may be implemented as one or more classes that can be stored in a library and start the authorization process for a web page when invoked by supplemental authorization code 148. A first class as part of AUTH_Web Authorization module 152 may be implemented as shown below.

```
{
    public AUTHSecureForm(string appname, string modulename);
    public void Secure(Form form, string authComponentProvider);
}
```

On each form, the "Secure( )" method is invoked to enable authorization framework 148 to perform authorization for the form. A second class is declared to encapsulate the menu functionality for the winforms and may be implemented as shown below.

```
internal class AUTHMenuInformation
{
    internal AUTHMenuInformation(int ID);
    internal bool IsVisible( );
    internal bool IsEnabled( );
}
```

The "Visible( )" and "Enabled( )" operations may be called on the web-based html controls defined in application 145. In the case of winform applications, authorization framework 158 provides a subclass for the NativeWindows class, which may be implemented as shown below.

```
internal class AUTHSubclass : NativeWindow
{
    internal AUTHSubclass(object control);
    protected override void WndProc(ref Message m);
    internal void OnHandleDestroyed(object sender, EventArgs e);
}
```

This class allows authorization framework 158 to intercept any intentional or unintentional authorization violations caused by programmers, making authorization framework 158 the final authorization authority in the solution.

AUTH_Principal module 153, AUTH_Principal Permission module 154 and AUTH_Principal Permission Attribute module 155 may be invoked by supplemental authorization code 148 as well as authorization modules 151-152. In some embodiments, modules 153-155 may include a set of interfaces that extend the interfaces implemented in ASP.NET's security framework.

AUTH_Principal module 153 may be implemented as a class that implements the interface shown below.

```
public interface IAUTHPrincipal : IPrincipal
{
    string Roles {get;}
    string RoleProvider {get;set;}
    bool IsAuthorized(IAUTHPermissionAttributes permission);
    AUTHOperation GetAccess(string id);
}
```

The IAUTHPrincipal class extends the IPrincipal interface defined in the .NET framework. The IAUTHPrincipal class can establish the identify of the authorized user and get all the roles defined for that particular user. It also validates if the user is authorized for a particular operation or can return all the permissions for all operations that the user can perform. The class also contains Role Provider information used to establish the roles that the current user belongs to.

AUTH_Principal Permission module 154 implements the IPermission interface of the .NET framework and extends the interface using its own interface called IAUTHPermissionsAttributes. The IAUTHPermissionsAttributes interface may be implemented as shown below.

```
public interface IAUTHPermissionAttributes
{
    string ID {get; set;}
    string Rule {get; set;}
    string RuleProvider {get; set;}
    string RuleExpression {get;}
    AUTHOperation Operation {get; set;}
    string OperationProvider {get; set;}
}
```

AUTH_Principal Permission module 154 itself is designed to bring together the Rule and the Operation on a given resource requested by a user. AUTH_Principal Permission module 154 may be implemented as an interface implemented by code as shown.
public sealed class AUTHPrincipalPermission: IPermission, IAUTHPermission-Attributes

```
public sealed class AUTHPrincipalPermission : IPermission,
IAUTHPermission-Attributes
{
    //class body...
}
```

AUTH_Principal Permission Attribute module 155 may implement a class which is responsible for the declarative access security model of authorization framework. The class can be implemented as shown below.

```
[AttributeUsage(AttributeTargets.All, AllowMultiple=false,
Inherited=false)]
public sealed class ECASPrincipalPermissionAttribute :
CodeAccessSecurityAttribute
{
    //class body...
}
```

Provider interfaces 156-159 send requests to providers 161-165 in response to a request from or being invoked by supplemental authorization code 148 or modules 153-155. In some embodiments, the providers may be invoked directly by supplemental authorization code 148 directly or indirectly by code 148 through modules 153-155. In response to a request or invocation, a provider interface will access a corresponding provider and return data from a provider response to the invoking object, method or other code. In any case, the invoked providers may accomplish certain functions, such as determine user roles, look up a rule defined for a component, determine allowed user operations, and so on, and provide the response to the interface that requested the function.

In embodiments where authorization framework 150 is implemented as an extension to a .NET 2.0 framework, provider interfaces 156-159 may be implemented as classes. An example of code for implementing a Role Provider Interface class is below.

```
public interface RoleProvider
{
    string GetRoles(IIdentity identity);
    Operation GetTokenRoleOperation(Principal principal, string token);
}
```

The class that implements this Role Provider interface provides methods to return a string of roles for the user in response to receiving a parameter of identity, wherein the identity may be a username received during login. The GetTokenRoleOperation method takes a principal (a user identifier generated for each username) and the resource requested by the user as its input and returns the set of operations (CRUDE+) that can be performed by a particular user on that resource.

An example of code for implementing a Rule Provider interface is below:

```
public interface RuleProvider
{
    string GetRule(string id);
}
```

The class that implements this Rule Provider interface implements one method that takes the name of the rule and returns the rule expression itself.

An example of code for implementing a Control Provider interface is below:

```
public interface ControlListProvider
{
    string GetControlList(string tokenName);
}
```

In some embodiments of the authorization framework, the resources can be individually tagged inside the application or be grouped together and defined externally by a tokenName. The class that implements this Control Provider interface provides a method that takes the tokenName and returns the list of 1 or more resources that are grouped together inside the tokenName.

An example of code for implementing an Operation Provider interface is below:

```
public interface OperationProvider
{
    Operation GetOperation(string tokenName);
}
```

The class that implements this Operation Provider interface provides a method that takes in a tokenName (that represents 1 or more token or resources) and returns the set of operations (CRUDE+) that are defined for it.

Providers 161-165 implement the authorization functionality of authorization framework 150. Each of providers 161-

165 may be implemented as a database, network server, library, data store or some other mechanism for storing data, and be implemented internal or external to application server 140. Each provider may also implement a business rules layer for receiving requests from an interface and processing the request to read, write, delete or otherwise process data. The embodiment of FIG. 1A shows several providers for handling roles, rules, control, and operation functions. In some embodiments, one provider may handle more than one authorization function (for example, a single provider may handle rule and control functions). In FIG. 1A, role provider 156 may manage user roles for a user and provide allowed operations on a component for a particular user. In one embodiment, role provider 156 may include tables containing username data, role data for each username, and operations allowed for each role. Rule provider 157 retrieves a rule expression in response to a request with a rule name. Rule provider 157 may contain one or more tables of rule names and corresponding rule expressions. Control provider 158 maintains a list of token names and corresponding tokens, and retrieves a token in response to a request with a token name parameter. Operation provider 159 may retrieve operations defined or allowed on a token in response to a request with a token name parameter.

Providers 161-165 may be implemented by different systems, machines, servers, and so on, as long as the provider is configured to interface with a provider interface. In some embodiments, authorizing framework 150 can be built around an existing framework used to provide a network service. For example, an existing framework on which the present authorization framework may be built on or extended from is "Windows ASP.Net", by Microsoft Corporation, of Redmond, Wash. In this embodiment, provider interfaces 151-154 are extended from the security ASP.NET security framework, and providers 161-165 are configured to communicate with the extended ASP.Net security framework provider interfaces.

Figure 1C:
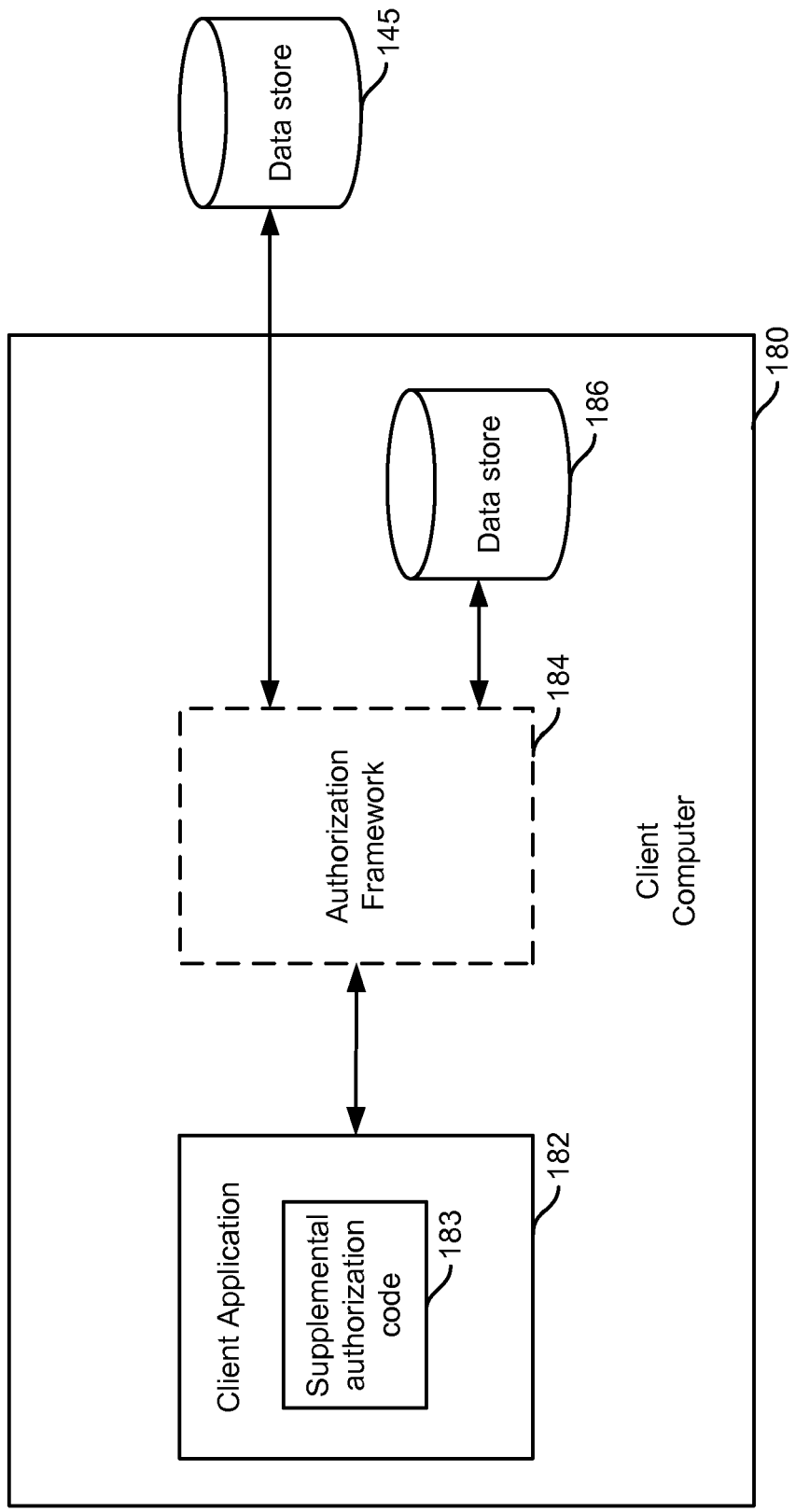
FIG. 1C is a block diagram of an embodiment of a system for externalizing application authorization for a client application.

FIG. 1C is a block diagram of an embodiment of a system for externalizing application authorization for a client application. FIG. 1C includes client computer 180 and data store 145. Client computer 180 and data store 145 may communicate over any network described above with respect to the communication between network server 130 and client 110.

Client computer 180 includes client application 182, authorization framework 184 and data store 186. Client application 182 includes supplemental authorization code 183. Supplemental authorization code 183 is similar to code 148 added to network based application 145 except that code 183 is added to client based application 182. Authorization framework 184 is similar to the Authorization framework 150 of FIG. 1A except it is implemented on client computer 180. In one embodiment, authorization framework may access data from data store 145 or data store 186 while providing authorization functionality.

Figure 1D:
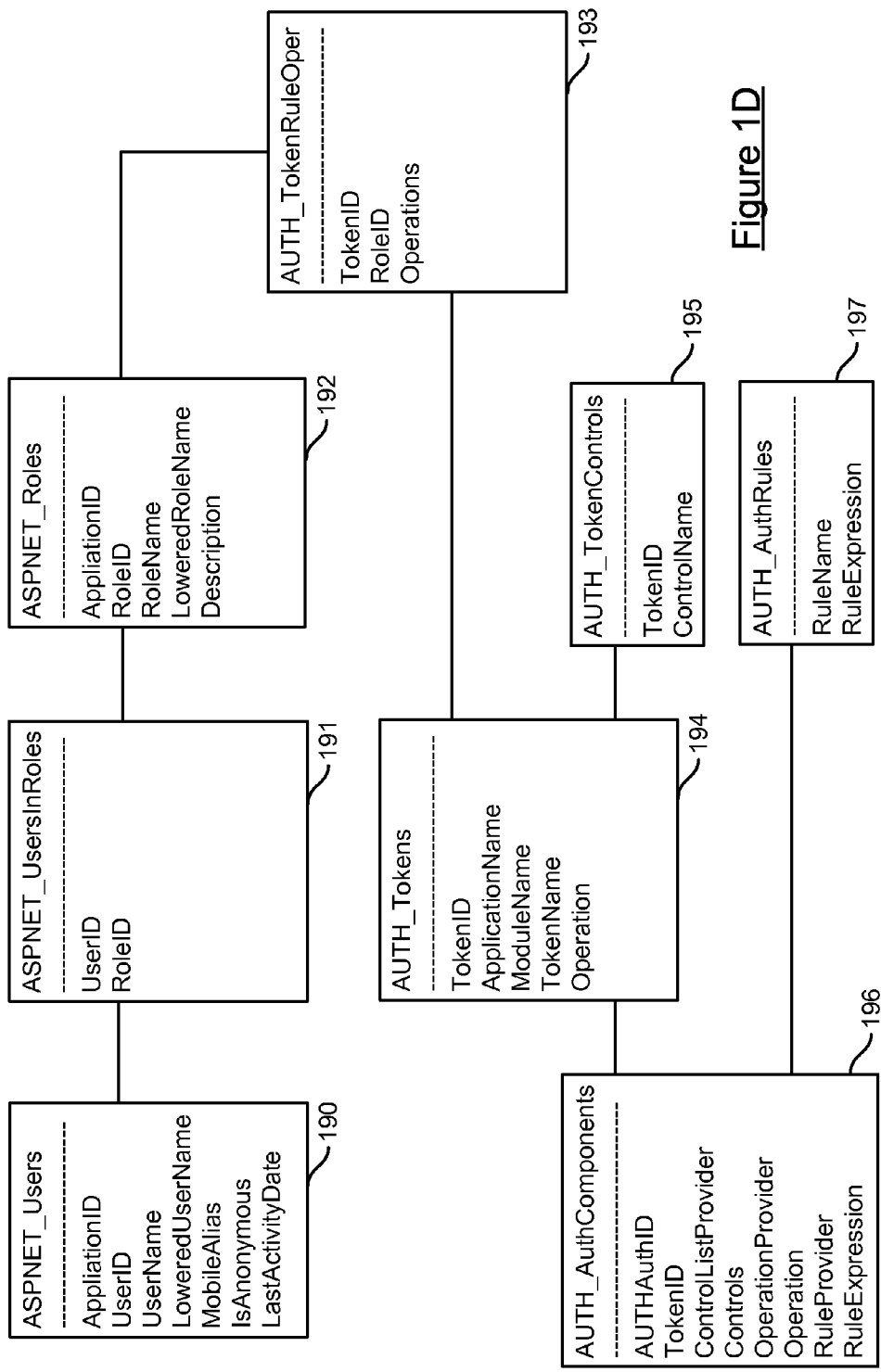
FIG. 1D illustrates an example of an authorization framework schema.

FIG. 1D illustrates an example of an authorization framework schema. The schema is represented as a series of eight tables that are interrelated to each other and contain data that is used to provide an authorization framework. The data in the tables may be contained in one or more of providers 161-165 of authorization framework 150, data store 145 or data store 186. Tables 190-192 are included in ASP.NET framework and tables 193-197 are not included in ASP.NET.

Table 190 provides user data for users of an application supported by ASP.NET. The user data may include an application ID, user ID, username, lowered user name (e.g, a user nick name), mobile alias, an indication as to whether the user wishes to be anonymous and the last activity date for the user. Table 190 is typically accessed by providers including role provider 161 to determine a username from a user ID and vice versa.

Table 191 provides user role data for users of an application supported by ASP.NET. The user role data may include the user ID and the roles associated with that ID. Table 191 is typically accessed by providers including role provider 161 to determine the roles associated with a particular user.

Table 192 provides role data for an application supported by ASP.NET. The role data may include the application ID, the role ID, the role name, the lowered role name and a description. Table 191 can be accessed by providers including a control or operation provider to determine what roles may perform different actions on a resource.

Table 193 provides token rule operation data for a group of resources. The operation data may include a token ID, identification of roles associated with the token ID and one or more operations that can be performed by each role associated with the token ID. Table 193 is typically accessed by providers including operation provider 164.

Table 194 provides token data for a group of resources. The token data may include the token identification, name of the application containing the resources, module name, token name, and operations allowed on the token. Table 194 may also contain start date and stop date data for time phasing policies discussed in more detail below.

Table 195 provides token data and associated control groups. The token data may include a token ID and one or more control names associated with the token.

Table 196 provides component data. The component data may include an authorization ID, a token ID, control list provider, controls, operation provider, operation, rule provider and rule expression. Table 197 may be accessed by providers including operation provider 164.

Table 197 provides rules for an authentication framework provider. The provider rules include rule name and the rule expression. Table 197 may be accessed by providers including rule provider 162.

Figure 2:
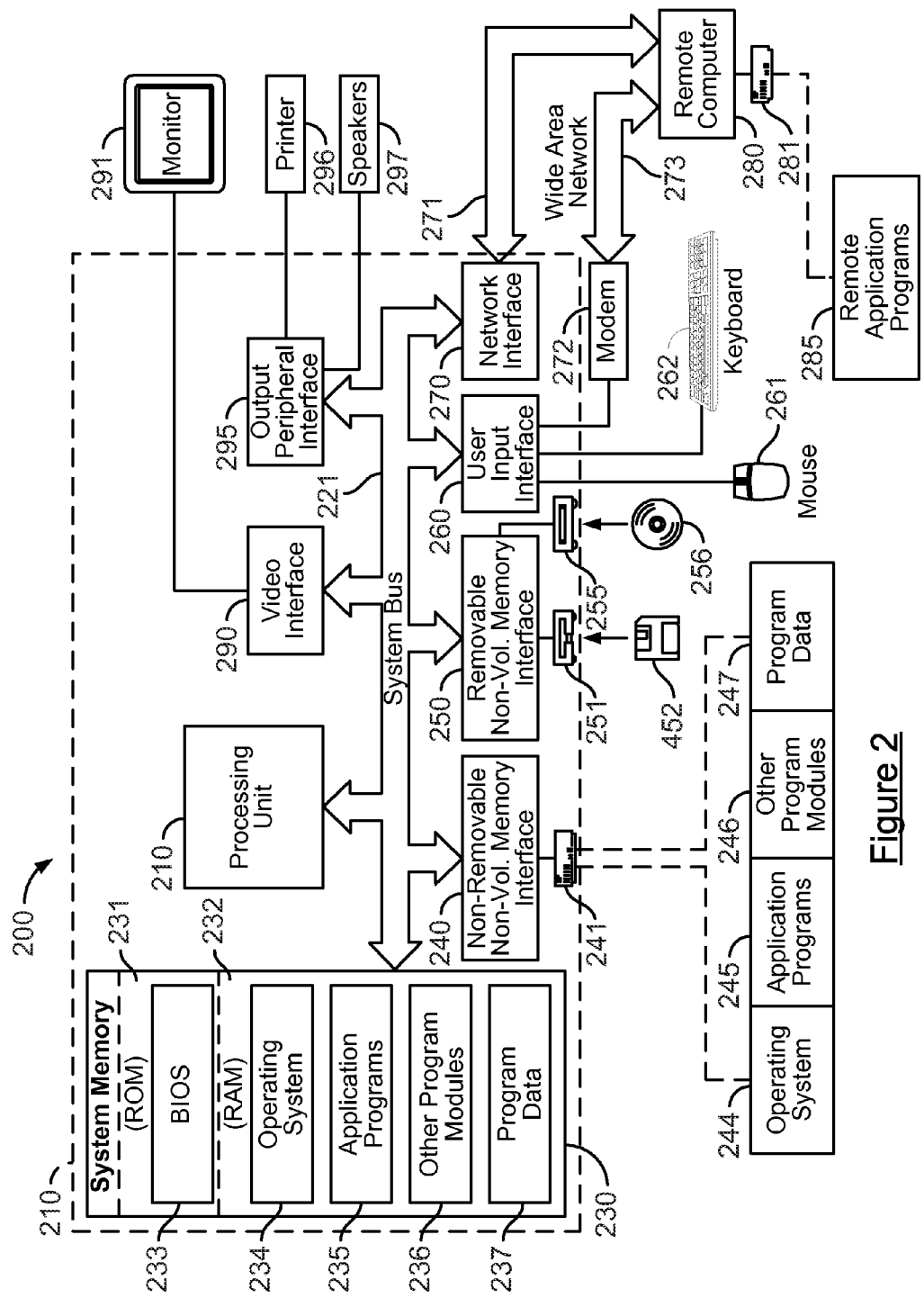
FIG. 2 is a block diagram of an embodiment of a system for providing a computing environment.

FIG. 2 illustrates an embodiment of a computing environment for implementing the present technology. In some embodiments, the computing environment of FIG. 2 may be used to implement client device 110, network server 130, application server 130, control providers 161-165 and client computer 185.

FIG. 2 illustrates an example of a suitable computing system environment 200 on which the present technology may be implemented. The computing system environment 200 is only one example of a suitable computing environment and is not intended to suggest any limitation as to the scope of use or functionality of the technology. Neither should the computing environment 200 be interpreted as having any dependency or requirement relating to any one or combination of components illustrated in the exemplary operating environment 200.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, cell phones, smart phones, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the technology includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

The flowcharts of FIGS. 3-8 relate to embodiments for providing an authorization framework. The embodiments are discussed with reference to network-based application 145 of the system of FIG. 1A. It is intended that an authorization framework could also be implemented for client-based application 162 of FIG. 1B as well as other systems.

Figure 3:
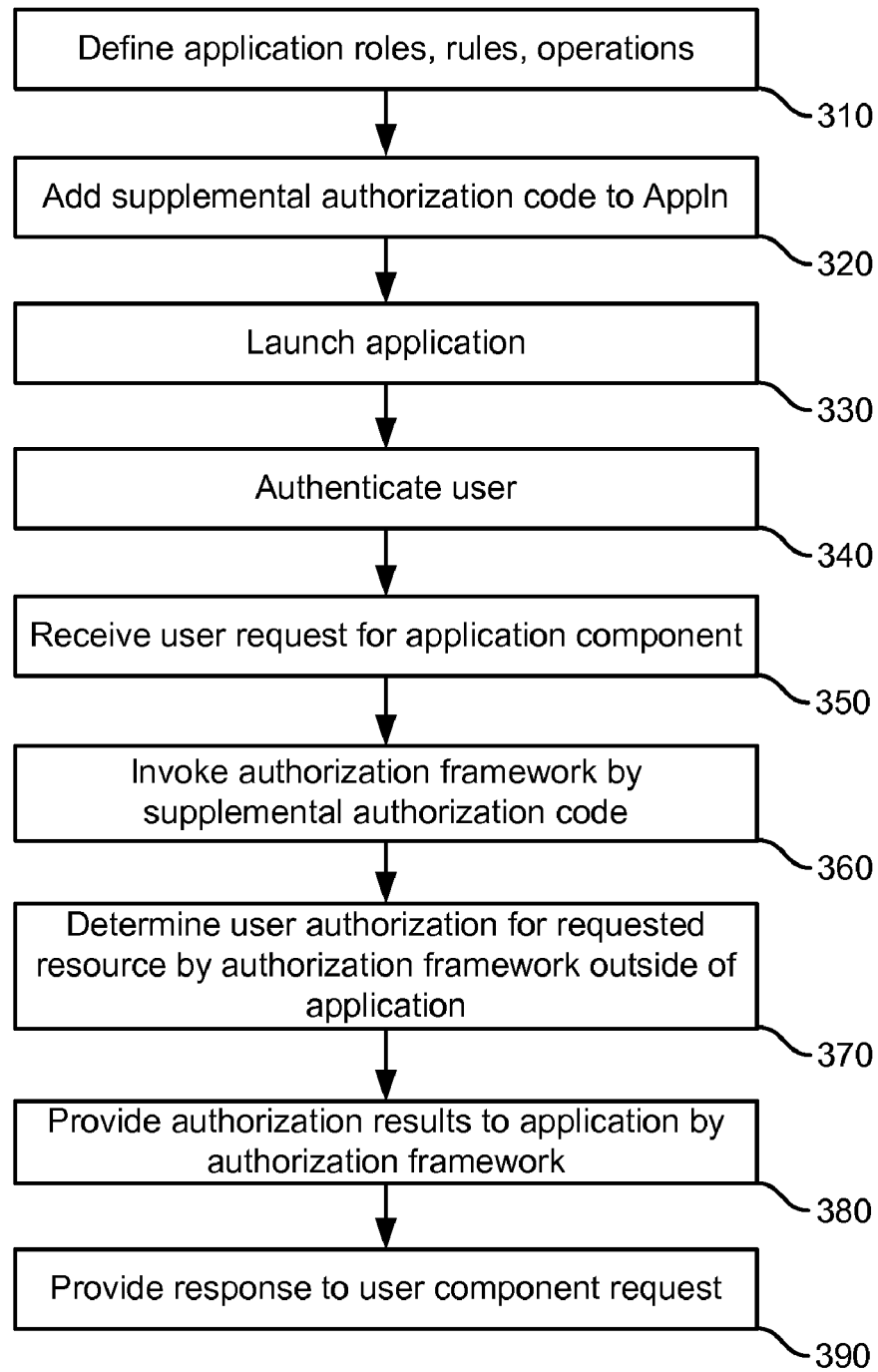
FIG. 3 is a flowchart of an embodiment of a process for providing a modular authorization framework.

FIG. 3 is a flowchart of an embodiment of a process for providing an authorization framework. First, application roles, rules and operations are defined at step 310. The roles, rules and operations are used to implement authorization for an application component and may be generated by an administrator or accessed from existing data. The data may be contained in tables, lists or in some other data structure or format. Providers 161-165 may store the data or have access to the data. For example, Role provider 156 may store generated role data, Rule Provider 157 may store generated rule data, Control provider 158 may store token control data and Control provider 159 may store token operation data.

Supplemental authorization code 148 is added to application 145 at step 320. In some embodiments, supplemental authorization code 148 is added to application code associated with an application component to determine whether a user requesting to perform an operation on the component is authorized to do so. As discussed above, the supplemental authorization code 148 may invoke authorization framework, take control of the application to determine user authorization, invoke or send requests to providers through a provider interface, and perform other functionality. Thus, authorization for the operation on the application component is performed external to the application itself.

Supplemental authorization code 148 may be added to application 145 in several ways. In one embodiment, the supplemental authorization code 148 may be added in a declarative or imperative manner. A declarative addition of supplemental authorization code 148 adds minimal lines of code which invokes AUTH_Principal Permission Attribute 155 of authorization framework 150. AUTH_Principal Permission Attribute 155 invokes one or more of AUTH_Principal 153 and AUTH_Principal Permission 154 to initiate the authorization process for a particular application component. An imperative addition of supplemental authorization code 148 adds a few more lines of code than a declarative addition and invokes providers 161-165 directly through provider interfaces 156-159. Thus, imperative supplemental authorization code 148 requires a few more lines of code to be added by a programmer, but a programmer is also allotted more control of how authorization framework 150 is invoked.

In some embodiments, a declarative addition of supplemental authorization code 148 may be added as an attribute for a method to be secured. The attribute can trigger one or more calls to external provider modules through provider interfaces, invoke another object or interface to invoke the provider interface (such as modules 153-155), or invoke a provider though some other combination of calls. When supplemental authorization code is used "declaratively" as an attribute, the code may be used with methods, user interface elements, and other components by inserting the declarative code before the corresponding component within the application code.

An example of code for use with an ASP.NET framework that can be used to declaratively secure a method by adding an attribute to the method is shown below.

```
[AuthPrincipalPermission(SecurityAction.Demand,
        User = "Username"
        RoleProvider = "Role Provider"
        Rule = "Rule Name",
        RuleProvider = "Rule Provider")]
private void Foo(string someParameter)
{
// body of Foo
}
```

In the code above, an AuthPrincipalPermission attribute is added to the method "Foo" to provide authorization for the method. When the method "foo" is invoked, the declarative code will be invoked as an attribute to the method. The added attribute calls the AuthPrincipalPermission method with parameters of username, role provider, rule name and rule provider. The AuthPrincipalPermission method then retrieves the role and rule through the appropriate provider interface. The AuthPrincipalPermission method is implemented by AUTH_Principal Permission module 154 and is discussed in more detail above with respect to FIG. 1B. An example of pseudo-code for implementing the AuthPrincipalPermission method is shown below.

The AuthPrincipalPermission attribute calls an AUTH-PrincipalPermission method to retrieve the rule and allowed operations on a given resource. The AUTHPrincipalPermission method implements the IPermission interface of the .NET Framework and extends it using an interface called AUTHPermissionsAttributes. The AUTH_Principal module 153 and AUTH_Principal Permission Attribute module 155 are discussed in more detail above with respect to FIG. 1B.

The AUTHPermissionAttributes method receives a username, rule name and rule provider and retrieves a Rule expression and allowed operations. The user role is obtained by the method "AuthPrincipalPermission" using the usemame and Role Provider data. The rule applied to the secure component is determined from the rule name and rule provider. The Principal Permission interface is one of several interfaces that may be used to extend the standard .NET interface in the security namespace in ASP.NET Framework 2.0 framework. Thus, in this embodiment, the supplemental authorization code is an attribute. The attribute calls a method (AUTHPRincipalPermission), which calls another method (AUTHPermission Attribute), which invokes providers through one or more provider interfaces.

After adding the supplemental authorization code 148, an application is launched at step 330. Once launched, the application runs and is available to process requests from client 110. After launching application 145, a user may be authenticated at step 340. User authentication allows the user to access a service account or other aspect of the network service. Typically, user authentication is determined in response to receiving a user login request. In some embodiments, user authentication involves receiving login credentials such as a username and password from a user, comparing the login credentials to user account login data, and determining whether or not the received login credentials match stored login credentials for a user account.

After successfully authenticating a user, a request is received from the user for a secured application component at step 350. The request can be for a web page, secure data (such as a Social Security number) or some other secured component of application 145. In some embodiments, the request may be associated with an operation to perform on the application component, such as a CRUD action or some other operation. After receiving the user request, authorization framework 150 is invoked by supplemental authorization code 148 within application 145 at step 360. Invocation is achieved when the added supplemental authorization code places a call to a provider interface, another method that calls the provider interface, or some other code that eventually causes a call to be made to a provider module through one of provider interfaces 156-159.

Next, user authorization for the requested component is determined by authorization framework 150 at step 370. In one embodiment, authorization framework 150 determines a user role, the rule which governs access for component requested by a user, and the state of user authorization at step 370. Determining user authorization for a requested component by authorization framework 150 is discussed in more detail below with respect to the process of FIG. 4.

Next, authentication results are provided to application 145 at step 380. The authorization results are provided by authorization framework 150 once it determines user authorization for a requested component. In some embodiments, the authorization result may be returned to application 145 in form of a token. The token may have a Boolean value indicating whether the user is or is not authorized to perform a requested operation on an application component. In some embodiments, the authorization may be returned to application 145 in some other form, such as a parameter, a pointer to a memory value or stored authorization state, or some other form. After returning authorization result, a response is provided by application server 140 to client device 110 at step 390. The response can indicate whether or not access to the user requested component is granted or denied for the user. If the component request is granted, the requested user interface, page, data or other component is provided to the user. If the user is not authorized to access the requested component, the component will not be provided. Rather, application 145 may provide a message indicating request has been denied, remove the component from a page requested by the user (such as not providing a particular text box within a web page), or take some other action to explicitly or implicitly indicate that the user does not have authorization to perform the requested operation on the indicated component. In some embodiments, the response to the user request may be provided by authorization framework 150. In this embodiment, step 390 is performed as part of determining user authorization at some time before control is returned to application 145.

Figure 4:
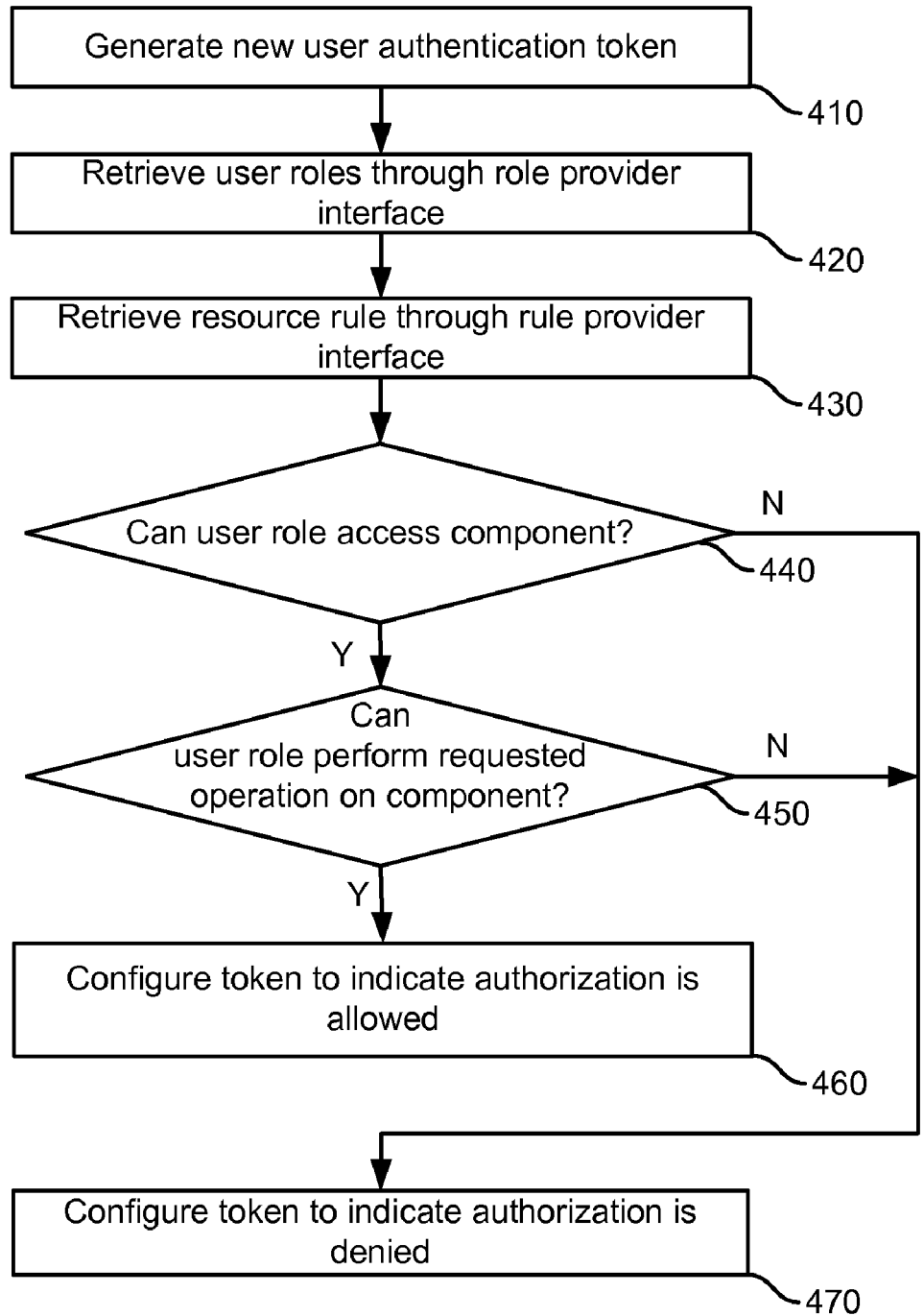
FIG. 4 is a flowchart of an embodiment of a process for determining user authorization for a requested component.

FIG. 4 is a flowchart of an embodiment of a process for determining user authorization for a requested component. In one embodiment, the process of FIG. 4 provides more detail for step 370 of the process of FIG. 3 and is performed by authentication framework 150 completely external and separate from application 145. The process of FIG. 4 may be initiated or controlled by one or more of several modules of the authorization framework. In some embodiments, the process of FIG. 4 is initiated by AUTH_Principal Permission Attribute module 155 which includes a principal permission attribute method. In some embodiments, the process of FIG. 4 is initiated by methods contained in AUTH_Principal module 153, AUTH_Principal Permission module 154, AUTH_Form Authorization module 151 or AUTH_Web Authorization module 152, depending on which module(s) are invoked by supplemental authorization code 148.

First, a new user authentication token is generated at step 410. In one embodiment, a user authentication token is generated for each request made by a user for a secured component. The authentication token is assigned a Boolean value which indicates an authentication state. For example, a state of "0" may indicate the user does not have authorization to perform the requested operation on a component and a value of "1" may indicate a user does have the required authentication. Once authorization is complete, the token is assigned a value.

A user role is retrieved from role provider 156 at step 420. As discussed above, each user account is associated with a role. Each role is associated with a certain level of permission. For example, a manager role will have a certain permissions that may differ from an employee role. In step 420, the role is retrieved from role provider 156 through a request made to role provider interface 161. Retrieving a user role from a role provider is discussed in more detail with respect to FIG. 5.

A component rule is retrieved from a rule provider at step 430. Supplemental authorization code 148 may access rules from rule provider 157 through rule provider interface 162. Retrieving a component rule from a rule provider at step 430 is discussed in more detail below with respect to the process of FIG. 6.

A determination is made as to whether the user role may access a component at step 440. Step 440 involves determining whether the role associated with the user may perform any operation on the requested component by comparing the user role to the roles specified in the component rule. Determining whether the user role may access the requested component is discussed in more detail with respect to the process of FIG. 7. If the user role may not access the component, the request is denied at step 470. If the user role can access the component, the process of FIG. 4 continues to step 450.

A determination is made as to whether the user role may perform the specifically requested operation on the component at step 450. In one embodiment, this determination is made separately from step 440 because it requires a separate query to a provider. Authentication framework 150 determines whether or not the role associated with the user can perform the requested operation on the particular component. Determining whether the user role can perform a requested operation on the component is discussed in more detail below with respect to the process of FIG. 8. If the user role may not perform the requested operation on the component, then the user is not authorized and a user authentication token is set to "deny" at step 470. If the user role may perform the requested operation on the particular component, user authentication token is set to "allow" at step 460. In this case, the component may be provided in a response to the user component request as discussed above at step 390.

Figure 5:
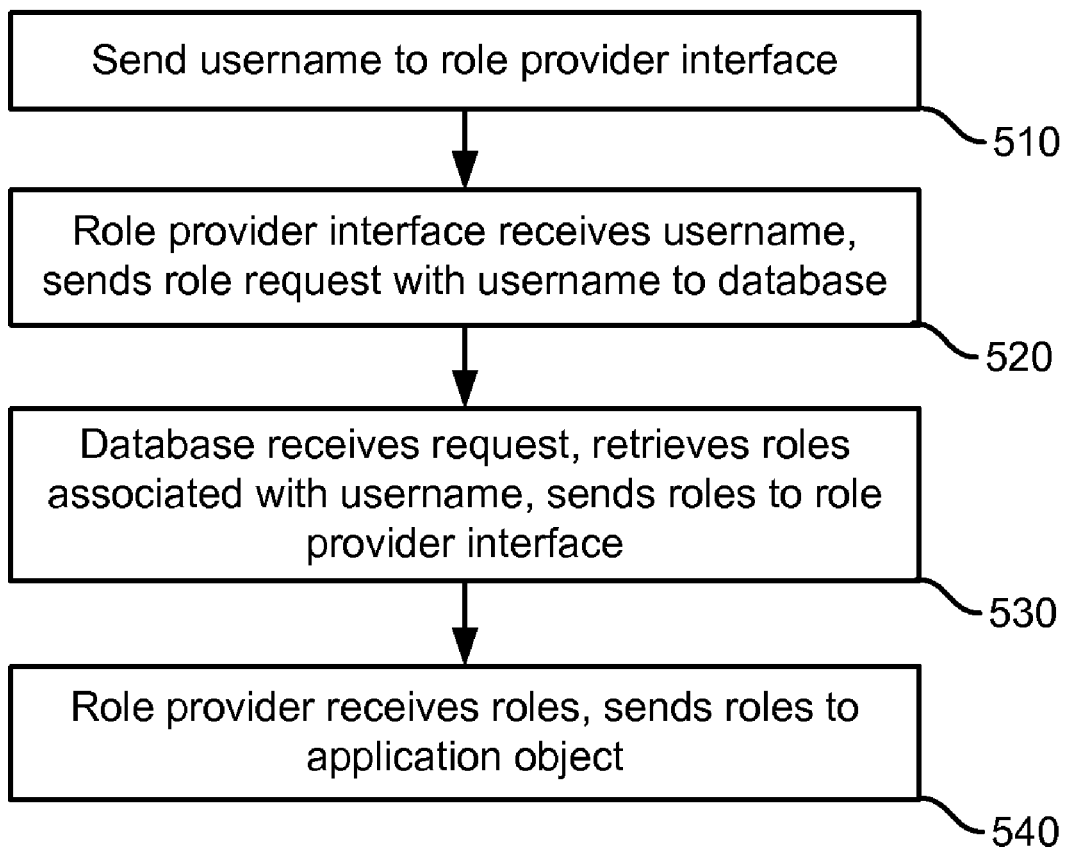
FIG. 5 is a flowchart of an embodiment of a process for retrieving user roles.

FIG. 5 is a flowchart of an embodiment of a process for retrieving user roles. In one embodiment, the process of FIG. 5 provides more detail for step 420 of the process of FIG. 4. First, a username is sent in a message to role provider interface 161 at step 510. In one embodiment, the username may be retrieved from user login credentials provided at user login when the user was authenticated at step 340 of the process of FIG. 3. In some embodiments, when authorization framework 150 is generated based on Microsoft's ASP.Net security framework, the username is assigned to a new principle object. In this case, the principle is sent to role provider interface 161.

Role provider interface 161 receives the username data and sends a role request with the username data to a role provider 156 at step 520. Role provider 156 receives the request, retrieves the roles associated with the username included in the request and sends the roles to role provider interface 161 at step 530. Role provider interface 161 receives the roles and forwards the received roles to supplemental authorization code 148 within application 145 at step 540.

Figure 6:
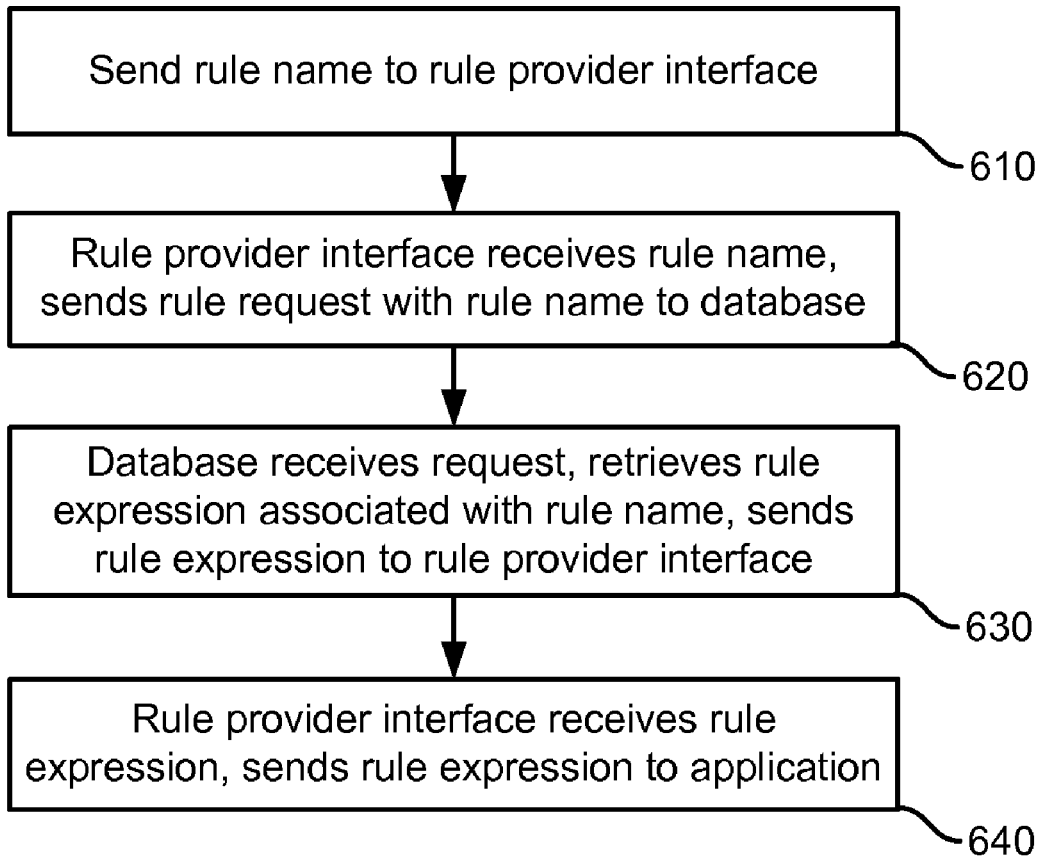
FIG. 6 is a flowchart of an embodiment of a process for retrieving a rule for a component.

FIG. 6 is a flowchart of an embodiment of a process for retrieving a rule for a component. In some embodiments, the process of FIG. 6 provides more detail for step 430 of the process of FIG. 4. A message that contains a rule name is sent to rule provider interface 162 by the supplemental authorization code 148 at step 610. In some embodiments, the rule name is contained in the supplemental authorization code 148 added to application 145.

After sending the rule name to rule provider interface 162, rule provider interface 162 receives the rule name and sends the rule request with the rule name to rule provider 157 at step 620. Next, rule provider 157 receives the request, retrieves the rule which corresponds to the rule name, and sends the rule to rule provider interface 162 at step 630. In one embodiment, rule provider 157 may contain or have access to a table or other data structure having data created at step 310 of the process of FIG. 3. Rule provider interface 162 receives the rule expression and sends the rule expression to requesting supplemental authorization code 148 in application 145 at step 640.

Figure 7:
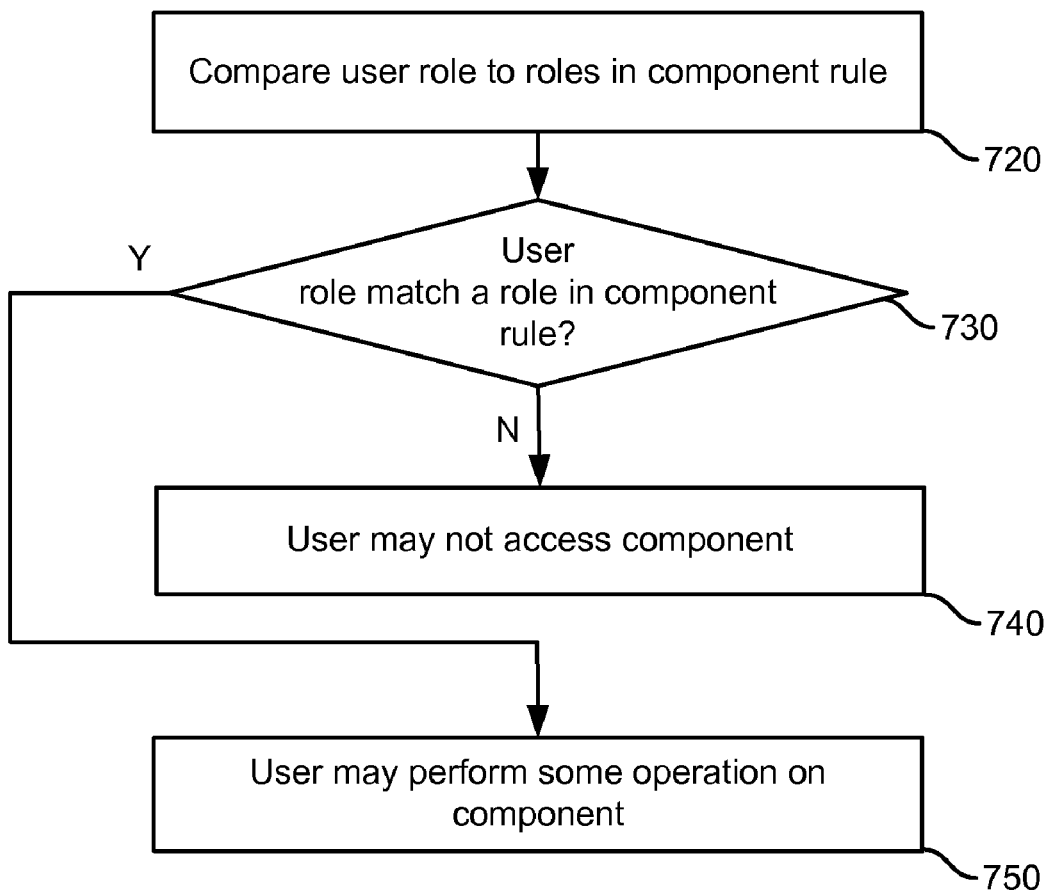
FIG. 7 is a flowchart of an embodiment of a process for determining access to a component for a role.

FIG. 7 is a flowchart of an embodiment of a process for determining access to a component for a role. In one embodiment, the process of FIG. 7 provides more detail for step 440 of the process of FIG. 4. First, the retrieved user role is compared to the roles specified in the component rule at step 720. In one embodiment, the user role is retrieved at step 420 and is compared to the roles contained in the rule expression retrieved per the process of FIG. 6. For example, a rule expression may indicate that an employee role may read user bank account balance and a bank supervisor may edit the user bank account balance. In this case, the role of the user would be compared to the roles of manager and CEO to determine if there was a match.

A determination is then made as to whether the user role matches a role in the component rule at step 730. If the user role matches one of the roles, the user may perform some operation on the component as determined at step 740. The process of FIG. 7 is performed in order to determine if the user may be authorized to perform the desired operation on the particular component. If the user role does not match a role in the component rule, the user may not access the requested component at step 730.

Figure 8:
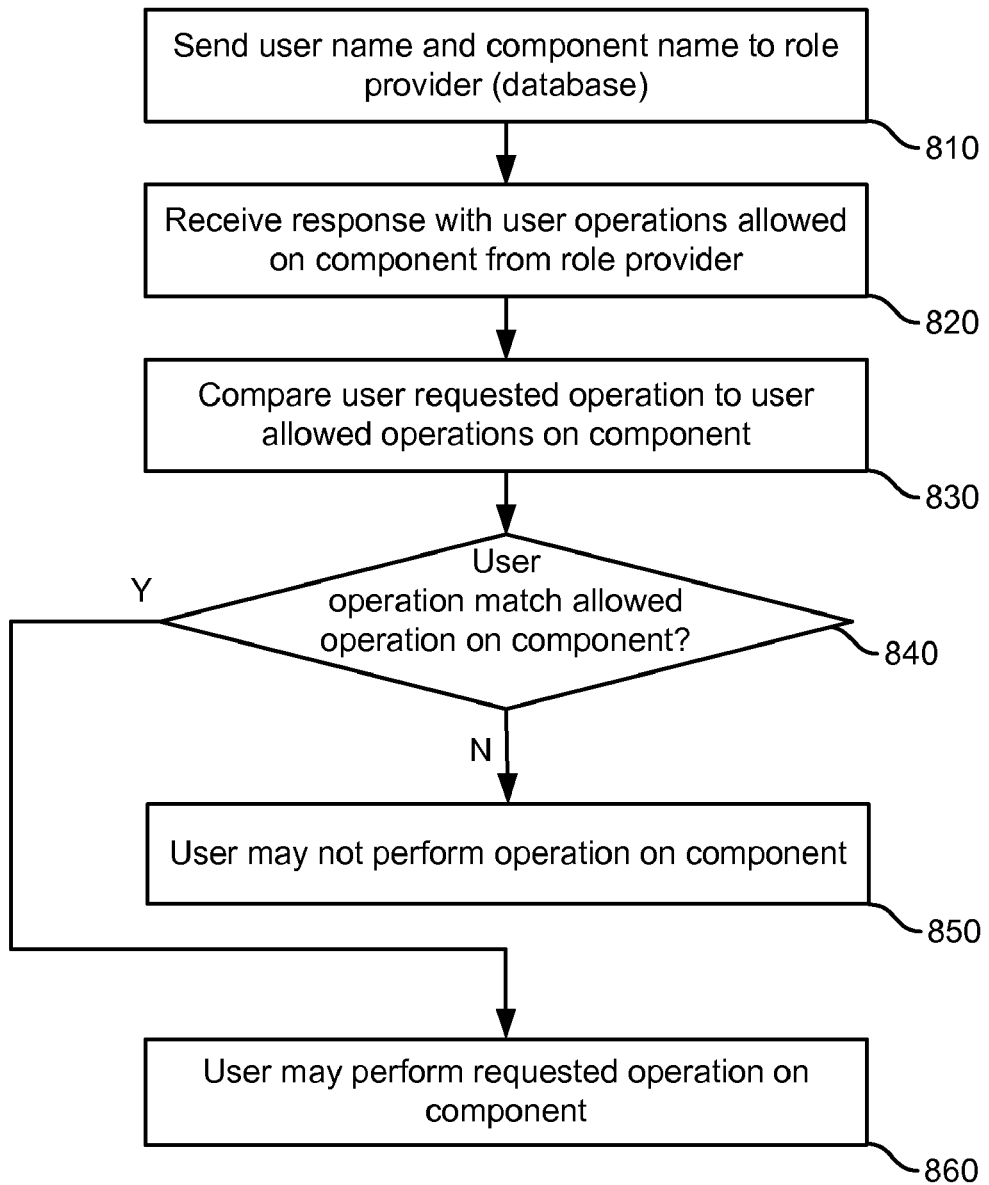
FIG. 8 is a flowchart of an embodiment of a process for determining allowed operations on a component for a role.

FIG. 8 is a flowchart of an embodiment of a process for determining allowed operations on a component for a role. In one embodiment, the process of FIG. 8 provides more detail for step 450 of the process of FIG. 4. First, a user role and a component name are sent to role provider 156 at step 810. In case of a base framework of ASP.Net, supplemental authorization code 148 may send a principle and a component name to role provider 156. As discussed above with other role provider transactions, the user role and component name are sent to role provider interface 161, which forwards the request to role provider 156. Role provider 156 receives the request, processes the request to determine the requested data, and sends the requested data back to the requesting source through role provider interface 161. With respect to step 810, the role provider receives the username and component name, retrieves the actions that the user associated with the username may perform on the component, and sends the list of actions in response to the role provider interface 161.

A response is received from role provider 156 through role provider interface 161 with the user operations allowed on the component at step 820. Next, a user requested operation is compared to the allowed operations for the user on the component at step 830. The user requested operation is the operation requested at step 350 of the process of FIG. 3. A determination is then made as to whether the requested user operation matches any allowed operations on the particular component at step 840. If no user operation matches an allowed operation, the user may not perform the requested operation on a component as determined at step 850. If the user requested operation does match an allowed operation on a component, the requested operation may be performed on a component at step 860.

In some embodiments, a time phasing policy may be integrated into the authorization framework. Policies are used to apply rule(s) around how a resource is secured. Time phasing and policy expiration provides a mechanism by which a policy can indefinitely remain in the system and yet be activated or deactivated in a certain time. The activation and expiration of a policy can be controlled by the implementer of the authorization framework. In addition to applying a policy, the authorization framework can also be configured to remove security around resources before the policy is active or after the policy is expired. For example, when a product is launched, a promotion period may allow all users access to the resources freely. Once the promotion period has ended, the policy kicks in and the resources are secured as defined by the rules in the policy. In another example, configuring a launched product to be available only to a select group of users for a beta period can be accomplished using the policy activation and deactivation feature. In addition, when the beta period of the product is over, the resource can be made available to all with out any security by configuring the authorization framework with a policy that expires and then allows all users free access. All such scenarios can be configured in the authorization framework to have an application behave according to business requirements without manual intervention or hard-coding the application.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for authorizing a request for a component within an application, comprising:
   providing a first interface for directly calling a plurality of provider modules that are for implementing authorization, the provider modules are directly callable through the first interface by supplemental authorization code to provide a granular level of authorization;
   providing a second interface that is directly callable by supplemental authorization code, a call to the second interface allows one or more of the plurality of provider modules to be specified, the second interface invokes at least the specified provider module or modules to provide authorization;
   receiving an authorization request at an external authorization system from supplemental authorization code inside an application, the authentication request is received either at the first interface or the second interface, the authorization request requests authorization to perform an operation on a component within the application, the external authorization system located external to the application;

determining whether a role is authorized to perform the requested operation on the application component by the external authorization system, the determining includes retrieving a rule which specifies one or more operations that one or more roles are allowed to perform on the application component;

configuring a token in response to said step of determining, the token indicating the authorization for the requested operation on the application component; and providing the token to said application.

2. The method of claim 1, wherein said step of determining whether a role is authorized includes:

sending a request to a role provider interface by a first set of code within the external authorization system;

receiving a response with the user role from the role provider interface.

3. The method of claim 1, wherein said step of determining whether a role is authorized includes:

sending a request with a username to a provider module within the external authorization system by a first set of code in the external authorization system.

4. The method of claim 3, further comprising:

retrieving the username from login data associated with user authentication data.

5. The method of claim 1, wherein said step of determining whether a role is authorized includes:

invoking a first set of code for authorizing a web page within the external authorization system;

invoking a set of principal identification code by a first set of code; and invoking a role provider module through a role provider interface by the principal identification code.

6. The method of claim 1, wherein said step of determining whether a role is authorized includes:

invoking a first set of code for authorizing a form within the external authorization system;

invoking a set of permission identification code by a first set of code; and invoking a rule provider module through a rule provider interface by the permission identification code.

7. The method of claim 1, wherein said step of receiving an authorization request includes:

receiving a first request from the supplemental authorization code to invoke a role provider to provide user role data;

receiving a second request from the supplemental authorization code to invoke a rule provider to provide user rule data, wherein said step of determining whether a role is authorized is performed using the role data retrieved by the first request and the rule data retrieved by the second request.

8. The method of claim 1, wherein said step of determining whether a role is authorized includes:

comparing the user role to one or more roles specified in the rule.

9. A computer storage device having processor readable code embodied on said computer storage device, said processor readable code for programming one or more processors to perform a method comprising:

adding first supplemental authorization code to an application, the application having a plurality of application components within the application, the supplemental authorization code associated with a first of the application components, said adding includes adding, to the application, a rule name, rule provider module name, and code for sending the rule name and rule provider module name in a message to an external authorization system;

adding second supplemental authorization code to the application, the second supplemental authorization code associated with a second of the application components, said adding includes adding, to the application, code for directly calling the rule provider module name in a message to the external authorization system;

receiving a request for the first application component at the application;

invoking the external authorization system by the first supplemental authorization code to determine whether the request for the first application component is authorized, the external authorization system located external to the application;

receiving authorization results from the external authorization system by the first supplemental authorization code of the application;

receiving a request for the second application component at the application;

invoking the rule provider module in the external authorization system by the second supplemental authorization code directly calling the rule provider module; and receiving results from the rule provider module by the second supplemental authorization code.

10. The computer storage device of claim 9, wherein said adding includes adding, to the application, code for sending role data associated with a user that initiated the request.

11. The computer storage device of claim 9, wherein said adding includes adding, to the application, code for sending a role provider module.

12. The computer storage device of claim 9, further comprising:

performing an authorization action for the component application on the authorization results.

13. A method for providing authorization, comprising:

storing role data in a role provider and rule data in a rule provider, the role provider and rule provider are included in a set of providers, the role data associated with a user of an application and the rule data associated with a resource within the application, the set of one or more providers included in an external authorization system located external to the application;

providing a form authorization module that provides authorization support for smart clients, the form authorization module starts authorization for a web page when invoked by supplemental authorization code within an application;

providing a web authorization module that provides authorization support for web clients, the web authorization module starts authorization for a web page when invoked by supplemental authorization code within an application;

receiving an authorization request for the resource from supplemental authorization code within the application, the supplemental authorization code is associated with the resource, the authorization request identifies a user name, the role provider, the rule provider, and a rule name, the authorization request is received through a set of provider interfaces included in the external authorization system;

accessing the role data by the set of providers in response to the authorization request received through the set of provider interfaces;

accessing the rule data by the set of providers in response to the authorization request received through the set of provider interfaces;

determining an authorization state from the accessed role data and rule data; and providing the authorization state to the application.

14. The method of claim 13, wherein said step of determining an authorization state includes:

comparing the accessed role data to one or more roles specified in the accessed rule data.

15. The method of claim 13 wherein said step of determining an authorization state includes:

identifying an operation requested by a user on the application resource;

comparing the requested operation to one or more allowed operations specified in the rule associated with the application resource.

16. The method of claim 13 wherein said step of providing the authorization state to the application includes:

returning a Boolean value to the application in response to said step of determining an authorization state.

17. The method of claim 1, wherein the component within the application is a field in a user interface provided by the application.

18. The method of claim 1, further comprising providing the plurality of provider module, including:

providing a role provider module that returns roles of users;

providing a rule provider module that inputs a name of a rule and returns a rule expression;

providing a control provider module that receives a token name and returns one or more resources that are grouped together inside the token name; and providing an operation provider module that inputs a token name and returns a set of operations that are defined for the token name.

19. The method of claim 18, wherein providing the second interface includes providing a module that inputs a rule, an indicator of the rule provider module, an operation, and an indicator of the operation provider module that are provided in a call to the second interface, the module calls the rule provider module and the operation provider module.

20. The method of claim 13 wherein the form authorization module includes a method that is invoked on each active server page for the smart client.

* * * * *